(12) United States Patent
Garoff et al.

(10) Patent No.: US 10,689,256 B2
(45) Date of Patent: Jun. 23, 2020

(54) CONDUCTIVE CARBON POWDER, A METHOD FOR THE MANUFACTURING THEREOF AND USE THEREOF

(71) Applicant: Stora Enso OYJ, Helsinki (FI)

(72) Inventors: Niklas Garoff, Hägersten (SE); Stephan Walter, Enskede (SE); Gunnar Seide, Aachen (DE); Thomas Gries, Aachen (DE); Wilhelm Steinmann, Aachen (DE); Andreas De Palmenaer, Eupen (BE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/855,388

(22) Filed: Dec. 27, 2017

(65) Prior Publication Data

US 2018/0118572 A1 May 3, 2018

Related U.S. Application Data

(62) Division of application No. 15/107,194, filed as application No. PCT/IB2014/067219 on Dec. 22, 2014, now abandoned.

(30) Foreign Application Priority Data

Dec. 23, 2013 (SE) ...................................... 1351582

(51) Int. Cl.
*H01B 1/24* (2006.01)
*C01B 32/05* (2017.01)
(Continued)

(52) U.S. Cl.
CPC ................ *C01B 32/05* (2017.08); *C07G 1/00* (2013.01); *C08K 3/04* (2013.01); *C08K 7/06* (2013.01);
(Continued)

(58) Field of Classification Search
CPC ...... C08K 7/06; C08K 2201/001; C08K 3/04; C08L 23/10; C08L 97/005; C08L 23/12;
(Continued)

(56) References Cited

U.S. PATENT DOCUMENTS 4,229,328 A 10/1980 Makino et al.
4,367,306 A 1/1983 Maeda et al.
(Continued)

FOREIGN PATENT DOCUMENTS

CN 1185291 C 1/2005
CN 101078137 A 11/2007
(Continued)

OTHER PUBLICATIONS

First Office Action for corresponding Chinese Patent Application No. 201480070542.4, dated Apr. 5, 2017.
(Continued)

*Primary Examiner* — Mark Kopec
*Assistant Examiner* — Jaison P Thomas
(74) *Attorney, Agent, or Firm* — Greer, Burns & Crain, Ltd.

(57) ABSTRACT

The present invention relates to a conductive carbon powder emanating essentially from lignin, a method for the manufacturing thereof and use thereof. Said powder may emanate from an electrically conductive carbon intermediate product, in turn emanating essentially from lignin. Further, uses thereof and compositions comprising said carbon powder are disclosed. Additionally methods for manufacturing said conductive carbon powder, also involving an electrically conductive carbon intermediate product emanating essentially from lignin, are disclosed together with a method for making said compositions.

20 Claims, 3 Drawing Sheets

Figure 1:
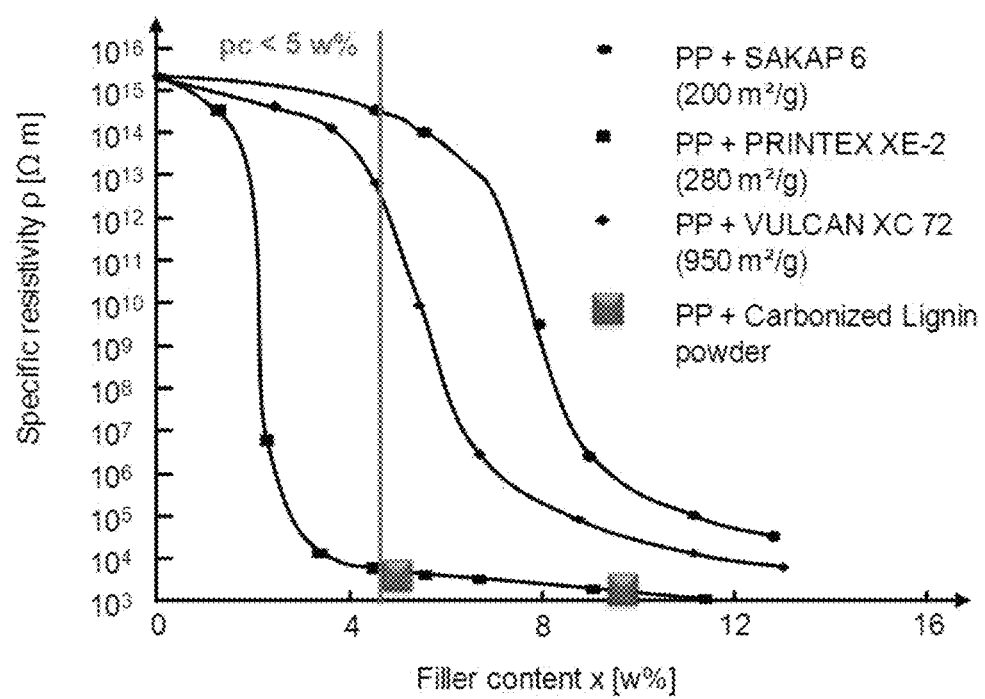

(51) Int. Cl.
*C07G 1/00* (2011.01)
*C09C 1/48* (2006.01)
*D01F 1/10* (2006.01)
*D01F 9/17* (2006.01)
*C08K 7/06* (2006.01)
*C08L 97/00* (2006.01)
*C08K 3/04* (2006.01)
*H01B 7/02* (2006.01)

(52) U.S. Cl.
CPC ............. *C08L 97/005* (2013.01); *C09C 1/48* (2013.01); *D01F 1/10* (2013.01); *D01F 9/17* (2013.01); *H01B 1/24* (2013.01); *H01B 7/02* (2013.01); *C01P 2006/40* (2013.01); *C08K 2201/001* (2013.01)

(58) Field of Classification Search
CPC ..... C01B 31/02; C01B 32/05; C01P 2006/40; C07G 1/00; C09C 1/48; D01F 1/10; D01F 9/17; H01B 1/24; H01B 7/02
See application file for complete search history.

(56) References Cited

U.S. PATENT DOCUMENTS

| | | | |
|---|---|---|---|
| 5,843,393 A * | 12/1998 | Denton, III | D01F 9/12 423/447.4 |
| 6,545,081 B1 | 4/2003 | Nishihata et al. | |
| 2010/0055458 A1 | 3/2010 | Jang et al. | |
| 2010/0159773 A1 | 6/2010 | Lai et al. | |
| 2010/0304141 A1 | 12/2010 | Kamegawa | |
| 2012/0003471 A1 | 1/2012 | Bissett et al. | |
| 2014/0021416 A1 | 1/2014 | Oguni et al. | |
| 2014/0038034 A1 * | 2/2014 | Rios | H01M 4/133 429/188 |
| 2015/0354100 A1 * | 12/2015 | Dixon | D01F 9/17 428/367 |

FOREIGN PATENT DOCUMENTS

| | | | |
|---|---|---|---|
| CN | 101264879 B | * | 7/2010 |
| CN | 101910060 A | | 12/2010 |
| CN | 202521070 | | 11/2012 |
| GB | 1241297 | | 8/1971 |
| GB | 1359764 | | 7/1974 |
| GB | 1410107 | | 10/1975 |
| JP | 49-058137 | | 5/1974 |
| JP | 2002531660 | | 9/2002 |
| JP | 2010242248 | | 8/2004 |
| JP | 2009155199 | | 7/2009 |
| JP | 2010242248 | | 10/2010 |
| JP | 2010242248 A | * | 10/2010 |
| WO | 2009072393 | | 6/2009 |

OTHER PUBLICATIONS

Xu Fu "Handbook of Chemical Products: Resins and Plastics (Edition 4th)", Aug. 31, 2006, pp. 149-150, Chemical Industry Press.
Hongjun Yu, "Plastic Products for Industrial Parts and Processing", Feb. 28, 2003, pp. 320-321, Science and Technology Literature Press.
Lifeng Wu, "Carbon Black Application Manual", Sep. 30, 2008, pp. 234-240, Chemical Industry Press.
Dianming Zhou, "Plastics Extrusion Molding Technician Handbook", Aug. 31, 2008, pp. 76-77, Chemical Industry Press.
Supplementary Partial European Search Report for corresponding European Application No. EP14873622, dated Jun. 1, 2017.
Jun Cao et al "Study on carbonization of lignin by TG-FTIR and high-temperature carbonization reactor", Fuel Processing Technology, Jul. 6, 2012, pp. 41-47, vol. 106.
Yamin Li et al "Study of structure and thermal stability properties of lignin during thermostabilization and carbonization", International Journal of Biological Macromolecules, Oct. 4, 2013, pp. 663-669, vol. 62.
International Searching Authority, International Search Report and Written Opinion, PCT/IB2014/067219, dated Apr. 15, 2015.
Snowdon, M R et al: "A Study of Carbonized Lignin as an Alternative to Carbon Black" ACS Sustainable Chemical Engineering, 2014, vol. 2, pp. 1257-1263.
Eberle, C. "Commercialization of New Carbon Fiber Materials Based on Sustainable Resources for Energy Applications", Report ORNL/TM-2013/54, Mar. 22, 2013, Oak Ridge National Laboratory.
Shi, F. et al. "Preparation and Characterization of Carbon Microfibre Through Shear Pulverization Using Pan-Will Equipment", Journal of Materials Engineering and Performance, 2010, vol. 19, No. 5, pp. 643-649.

* cited by examiner

CONDUCTIVE CARBON POWDER, A METHOD FOR THE MANUFACTURING THEREOF AND USE THEREOF

This application is a divisional application of U.S. patent Ser. No. 15/107,194, filed Jun. 22, 2016, which is a U.S. National Stage under 35 U.S.C. § 371 of International Application No. PCT/IB2014/067219, filed Dec. 22, 2014, which claims priority to Swedish Application No. 1351582-0 filed Dec. 23, 2013, each of which is hereby incorporated in its entirety.

FIELD OF INVENTION

The present invention relates to a conductive carbon powder emanating essentially from lignin, a method for the manufacturing thereof and use thereof. Said powder may emanate from an electrically conductive carbon intermediate product, in turn emanating essentially from lignin. Further, uses thereof and compositions comprising said carbon powder are disclosed. Additionally, methods for manufacturing said conductive carbon powder, also involving an electrically conductive carbon intermediate product emanating essentially from lignin, are disclosed together with a method for making said compositions.

BACKGROUND

Conductive plastics are used in many different applications where electromagnetic interference and electrostatic discharge must be avoided. Examples include packaging material for consumer electronics, computer or mobile phone housings, piping and tanks for flammable liquids such as gasoline tanks, wires and cables. Conventional plastics (thermoplastics and thermosets) have poor electrical conductivity and are prone to building up static electricity. They can be rendered dissipative or even conductive by adding pulverized conductive material at levels beyond the so called percolation threshold. The resulting compound comprising the plastic and the conductive material is called conductive plastic. The mechanical performance of the plastic, however, suffers from adding pulverized conductive material as impact strength and ductility decrease. High-performing conductive materials attain the percolation threshold at low addition levels, retaining the mechanical performance of the plastic. The most commonly used conductive material is conductive carbon black, a special and expensive grade of carbon black.

Carbon black is produced by pyrolysing oil with fuel gas in a furnace. In the production of conductive carbon blacks, pyrolysis is followed by expensive post treatment steps to increase conductivity, notably steam exposure to increase the surface area and extraction to remove contaminants. Carbon blacks and especially conductive carbon blacks have a strongly negative impact on the environment and a high $CO_2$ footprint due to the fact that fossil raw materials are used in a highly energy intense production process.

There is thus a need for a novel competitive high performing conductive material for the manufacture of conductive plastics.

Additionally, there also exists a need for a conductive material with lower environmental impact and $CO_2$ footprint.

During chemical pulping cellulosic fibers are separated from softwoods, hardwoods, and annual plant biomass, for further processing to paper, board, tissue products or chemicals. Separation is done in a liquid, e.g. the so called white liquor in Kraft pulping or organic solvent as in organosolv processes. Lignin can be isolated from the spent liquor and thereafter be used as a biofuel, or as raw material for chemicals and materials.

SUMMARY OF THE INVENTION

The present invention solves one or more of the above problems, by providing according to a first aspect an electrically conductive carbon powder emanating (i.e. originating) essentially from lignin, preferably emanating fully from lignin.

The present invention also provides according to a second aspect an electrically conductive carbon intermediate product emanating essentially from lignin, having the form of a powder or a shaped body such as, a wafer, bar, rod, film, filament or fleece.

The present invention also provides according to a third aspect a method for manufacturing a conductive carbon powder according to the first and second aspect comprising the following steps:
 a) thermal treatment of a lignin comprising compound to increase the carbon content to at least 80% to obtain an electrically conductive carbonized lignin intermediate product and
 b) mechanical treatment of the electrically conductive carbonized lignin intermediate product to obtain a carbonized lignin powder which is electrically conductive.

The present invention also provides according to a fourth aspect a method for manufacturing an electrically conductive carbon powder according to the first and second aspect, comprising the following steps:
 i) providing a lignin and at least one additive,
 ii) mixing said components,
 iii) shaping said mixture to form a shaped body,
 iv) performing a thermal treatment of said shaped body in at least one step of which the last step comprises a temperature ramp from room temperature to up to about 2000° C. in inert atmosphere, thus providing a conductive carbonized intermediate product
 v) pulverizing said conductive carbonized intermediate product, thus providing a conductive carbon powder.

The present invention also provides according to a fifth aspect a method for manufacturing a carbonized intermediate product in filament form, comprising the following steps:
 vi) providing a lignin and at least one additive,
 vii) mixing said components and melt spinning said mixture to a monofilament or multifilament bundle component,
 viii) performing a thermal treatment of said shaped body in two steps of which the last step comprises a temperature ramp from room temperature to up to about 2000° C. in inert atmosphere thus providing a conductive carbonized intermediate product in filament form.

The present invention also provides according to a sixth aspect a conductive carbon powder obtainable by the method of the third or fourth aspect.

The present invention also provides according to a seventh aspect a conductive carbonized intermediate product in filament form obtainable by the method of the fifth aspect.

The present invention also provides according to an eighth aspect use of a conductive carbon powder according to the first, second or fifth aspect as additive for the manufacture of electrically conductive polymer compositions, used in applications such as housings for computers and mobile phones, automotive appliances, wires, cables, pipes and aeronautical appliances.

The present invention also provides according to a ninth aspect use of a conductive carbon powder according to the first, second or fifth aspect as additive for the manufacture of electrically conductive polymer compositions for protection against electromagnetic interference or electrostatic discharge.

The present invention also provides according to a tenth aspect a composition comprising a conductive carbon powder according to the first, second or fifth aspect and a polymer, preferably a thermoplastic or a thermoset or a mixture of such polymers. Said polymer(s) may be of fossil origin.

The present invention also provides according to an eleventh aspect a method for the manufacturing of a composition according to a tenth aspect comprising mixing a conductive carbon powder with a polymer, preferably a thermoplastic or a thermoset or a mixture of such polymers.

The present invention also provides according to a twelfth aspect a polymer composition obtainable by a method according to the eleventh aspect.

The present invention also provides according to a thirteenth aspect use of a polymer composition according to the tenth or twelfth aspect in an electrically conductive material, such as a material used in computers, mobile phones, automotive appliances, wires, cables, pipes and aeronautical appliances.

The present invention also provides according to a fourteenth aspect a polymer composition for a semi-conductive layer of a cable comprising a conductive carbon powder according to the first, second or fifth aspect and a thermoplastic or a thermoset or a mixture of such polymers.

DETAILED DESCRIPTION OF THE INVENTION

It is intended throughout the present description that the expression "lignin" embraces any lignin which may be used for making a conductive carbon powder. Examples on said lignin are, but are not limited to softwood lignin, hardwood lignin, lignin from one-year plants or lignins obtained through different fractionation methods such as, organosolv lignin or kraft lignin. The lignin may e.g. be obtained by using the process disclosed in EP 1794363.

It is intended throughout the present description that the expression "a conductive carbon powder" embraces a powderous matter which consists of 80% or more of carbon, with a capability of rendering e.g. a thermoplastic or thermoset electrically conductive. Said thermoplastic or thermoset may further be a polymer of fossil origin. Said powder may further be a substitute for carbon black obtained from fossil sources.

It is intended throughout the present description that the expression "additive" embraces any additive that facilitates the manufacturing of a lignin-containing composition in e.g. melt-extrusion or melt-spinning for further processing to conductive carbonized lignin powder. Examples are, but are not limited to plasticizers (such as PEG, an example is PEG400), reactive agents that render lignin melt-extrudable such as aliphatic acids or lignin solvents. A lignin solvent may be an aprotic polar solvent, such as an aliphatic amide, such as dimethylformamide (DMF) or dimethylacetamide (DMAc), a tertiary amine oxide, such as N-methylmorpholine-N-oxide (NMMO), dimethylsulfoxid (DMSO), ethylene glycol, di-ethylene glycol, low-molecular-weight poly ethylene glycol (PEG) having a molecular weight between 150 to 20.000 g/mol or ionic liquids or any combination of said solvents and liquids.

It is intended throughout the present description that the expression "thermoplastic" embraces any thermoplastic polymer (which may be of fossil origin) that may be useful in the context of using a conductive carbon powder (which also includes contexts where carbon black is used). Said polymer may be, but is not limited to acrylates such as PMMA, PP (Polypropylene), PE (Polyethylene) such as HDPE (high density PE), MDPE (medium density PE), LDPE (low density PE), PA (Polyamide) such as nylon, PS (Polystyrene), Polyvinylchloride (PVC), polysulfone, ether ketone or polytetrafluoroethylene (PTFE). The PE may further be cross-linked (PEX). It may further be co-polymers comprising two or more of said polymers or mixtures comprising two or more of said polymers.

It is intended throughout the present description that the expression "thermoset" embraces any thermoset polymer (which may be of fossil origin) that may be useful in the context of using a conductive carbon powder (which also includes contexts where carbon black is used). Said polymer may be, but is not limited to polyurethanes, polyesters, phenol-formaldehyde, urea-formaldehyde, melamine, epoxy, cyanate esters, vulcanized rubber and polyimides. It may further be co-polymers comprising two or more of said polymers or mixtures comprising two or more of said polymers.

According to a preferred embodiment of the fourth aspect of the invention the additive is poly ethylene glycol.

According to a preferred embodiment of the fourth aspect of the invention the temperature ramp from room temperature is up to 1600° C.

According to a preferred embodiment of the fourth aspect of the invention the temperature ramp from room temperature is up to 1400° C.

According to a preferred embodiment of the tenth aspect of the invention the polymer is a thermoplastic or thermoset used for the manufacture of electrically conductive compounds, or a mixture of such polymers.

According to a preferred embodiment of the tenth aspect of the invention the polymer is a polyolefin, a co-polymer comprising a polyolefin or a mixture of polyolefins.

According to a preferred embodiment of the tenth aspect of the invention the polymer is a polypropylene (PP).

According to a preferred embodiment of the tenth aspect of the invention the conductive carbon powder when compounded gives a percolation threshold in the polymer compound at 1-40% addition level. Said compounding involves mixing (blending) polymers and said carbon powder in a molten state.

According to a preferred embodiment of the tenth aspect of the invention the conductive carbon powder when compounded lowers the volume resistivity of the polymer compound after the percolation point to $10^0$-$10^6$ Ω·cm.

According to a preferred embodiment of the fourteenth aspect of the invention the thermoplastic is a polyolefin, a co-polymer comprising a polyolefin or a mixture of polyolefins.

According to the fifth aspect of the invention the temperature range in the second thermal step may also be from room temperature up to 1600° C., or up to 1200° C. or up to 1000° C. In the first thermal step, the temperature may be up to 300° C.

Preferred features of each aspect of the invention are as for each of the other aspects mutatis mutandis. The prior art document(s) mentioned herein are incorporated to the fullest extent permitted by law. The invention is further described in the following examples, together with the appended figures, which do not limit the scope of the invention in any way. Embodiments of the present invention are described as mentioned in more detail with the aid of examples of embodiments, together with the appended figures, the only purpose of which is to illustrate the invention and are in no way intended to limit its extent.

FIGURE

FIG. 1 discloses volume resistivity of compounds comprised of PP (HP 561R from Lyondell Basell) and 5% respectively 10% of the conductive carbon powder described in this invention. For comparison percolation curves are shown for reference compositions comprising PP and three different commercial conductive carbon blacks, respectively.

Figure 2:
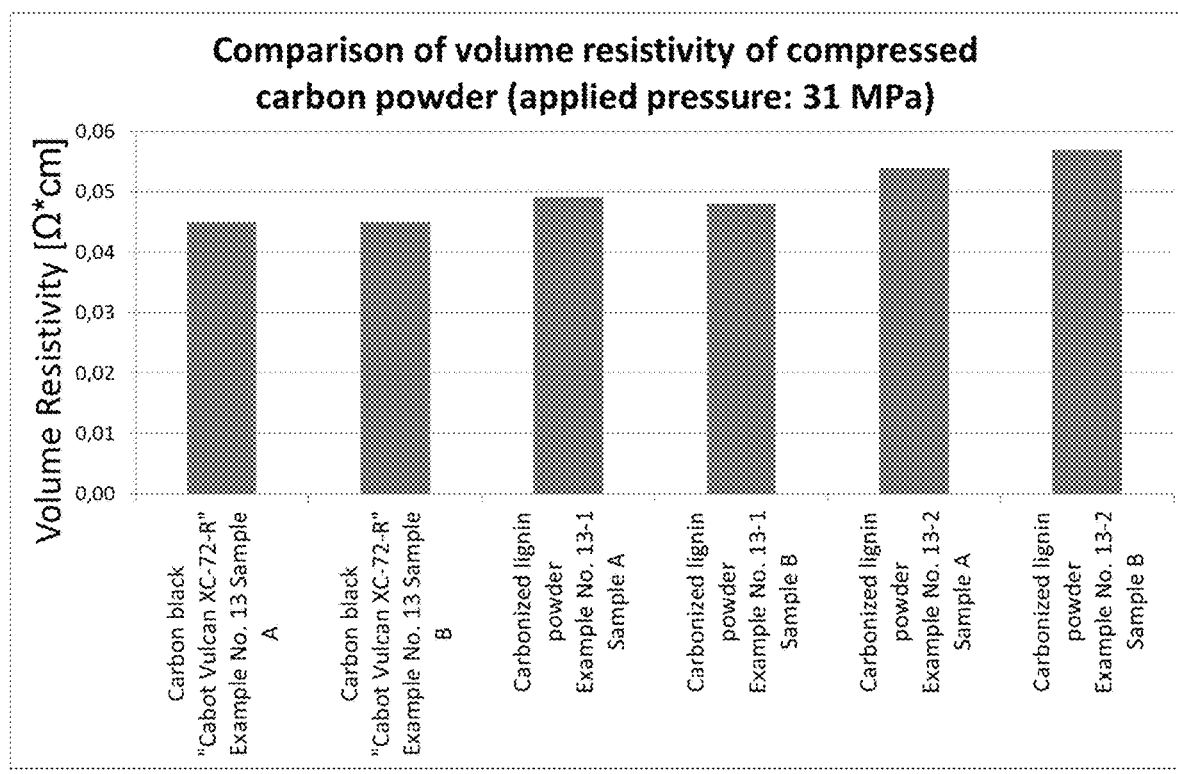

FIG. 2 discloses a comparison of volume resistivity of compressed carbon powder (applied pressure 31 MPa).

Figure 3:
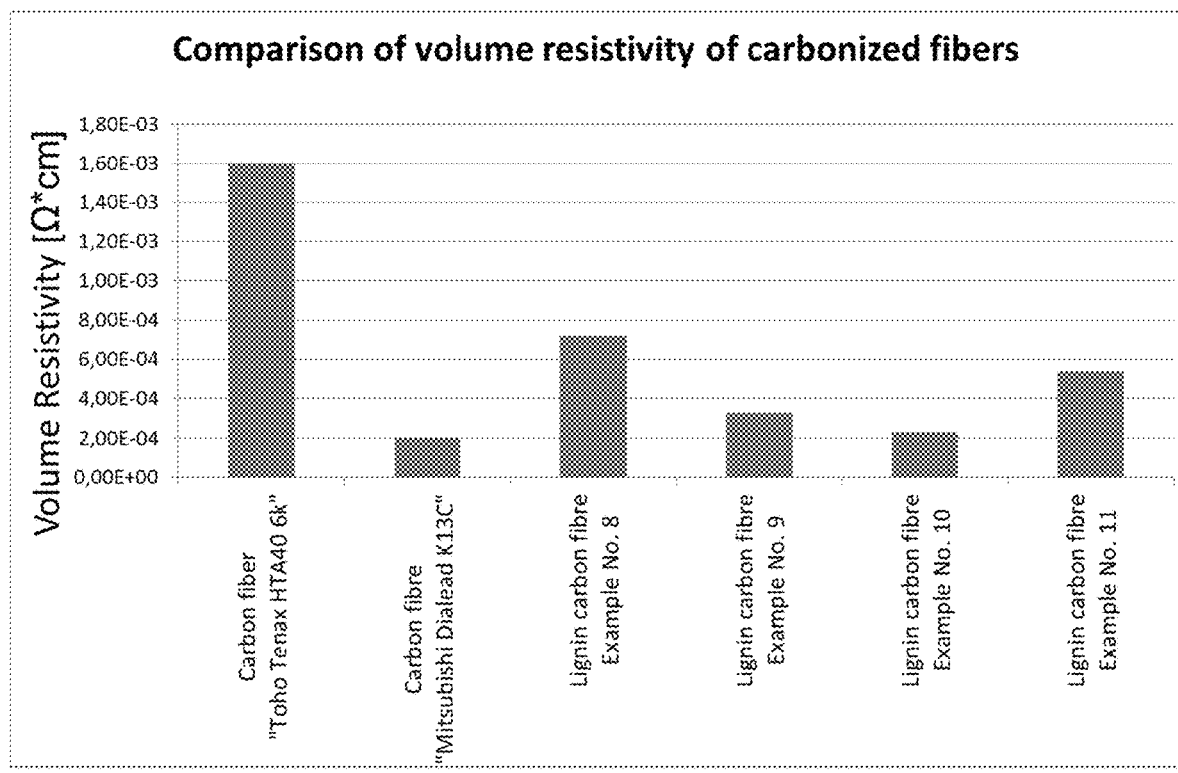

FIG. 3 discloses a comparison of volume resistivity of carbonized fibers.

EXAMPLES

Examples on Lignin-Containing Compound in Form of a Shaped Body

Example 1

A fiber was melt-spun from a mixture comprising of 88 w % softwood Kraft lignin, 7 w % Phthalic anhydride acid and 5 w % DMSO (97% purity, Sigma-Aldrich) using a laboratory twin-screw extruder with a single capillary (DSM Xplore micro-compounder). The obtained lignin-containing compound had the form of a filament with a diameter of 150 µm.

Example 2

The mixture from example 1 was extruded with a laboratory twin screw extruder (KEDSE 20/40" from Brabender GmbH & CO. KG) using a multifilament die with 62 capillaries. The obtained lignin-containing compound had the form of a multi-filament bundle with a single filament diameter of 72 µm.

Example 3

A mixture comprising 90 w % softwood lignin and 10% PEG 400 (Polyethylene Glycol from Sigma-Aldrich with a molecular weight of 400 Da) was prepared.

The mixture was extruded on a laboratory twin screw extruder using a die with 62 capillaries. The obtained lignin-containing compound had the form of a multi-filament bundle with a single filament diameter of 90 µm.

Example 4

A mixture was prepared as described in example three and put in a flat metal tube. Pressure was applied using a piston and as a result the lignin-containing compound attained the shape of a wafer.

Examples on Conductive Carbon Intermediate Products

Example 5

The lignin-containing filament from example 1 was converted in a two-step thermal treatment to obtain a conductive carbon intermediate product. In a first step the filament was heated in air from room temperature to 250° C. with a varying heating rate of between 0.2° C./min and 5° C./min and then heated in the second step in nitrogen from room temperature to 1600° C. with a heating rate of 1° C./min. The obtained conductive carbon intermediate product had the shape of a filament with a diameter of about 60 µm and yielded an electrical volume resistivity of $1.4 \times 10^{-3}$ Ohm*cm. Volume resistivity was measured using a LCR meter.

Example 6

The obtained spun filaments from example 2 where heat-treated in the same manner as described in example 5. The resulting carbonized multifilaments had a diameter of about 80 µm and yielded an electrical volume resistivity of $0.5 \times 10^{-3}$ Ohm*cm.

Example 7

The obtained filaments from example 3 were where heat-treated in the same manner as described in example 5. The resulting carbonized multifilaments had a diameter of about 75 µm and yielded an electrical volume resistivity of $0.6 \times 10^{-3}$ Ohm*cm.

Example 8

The obtained filaments from example 3 were heat-treated according to the following steps. In a first step the filament was heated in air from room temperature to 250° C. with a varying heating rate between 0.2° C./min and 5° C./min and then heated in the second step in nitrogen from room temperature to 1000° C. with a heating rate of 2° C./min. The obtained carbonized fiber yielded an electrical volume resistivity of $0.72 \times 10^{-3}$ Ohm*cm.

Example 9

The obtained filaments from example 3 were heat-treated according to the following steps. In a first step the filament was heated in air from room temperature to 250° C. with a varying heating rate between 0.2° C./min and 5° C./min and then heated in the second step in nitrogen from room temperature to 1200° C. with a heating rate of 2° C./min. The obtained carbonized fiber yielded an electrical volume resistivity of $0.33 \times 10^{-3}$ Ohm*cm.

Example 10

The obtained filaments from example 3 were heat-treated according to the following steps. In a first step the filament was heated in air from room temperature to 250° C. with a varying heating rate between 0.2° C./min and 5° C./min and then heated in the second step in nitrogen from room temperature to 1400° C. with a heating rate of 2° C./min. The obtained carbonized fiber yielded an electrical volume resistivity of $0.23 \times 10^{-3}$ Ohm*cm.

Example 11

The obtained filaments from example 3 were heat-treated according to the following steps. In a first step the filament was heated in air from room temperature to 250° C. with a varying heating rate between 0.2° C./min and 5° C./min and then heated in the second step in nitrogen from room temperature to 1600° C. with a heating rate of 2° C./min. The obtained carbonized fiber yielded an electrical volume resistivity of 0.54×10^-3 Ohm*cm.

Example 12

The wafer from example 4 was heat treated in nitrogen atmosphere by increasing temperature from room temperature to 1600° C. at a heating rate of 1° C./min to obtain a carbonized wafer.
Examples on Conductive Carbon Powder Example 13

The carbonized wafer from example 12 was manually crushed utilizing a laboratory mortar to obtain a conductive carbonized lignin powder.
Examples on Conductive Polymer Compounds Example 14

The conductive carbonized lignin powder from example 14 was compounded into a polypropylene matrix (HP 561R from Lyondell Basell) using a DSM Xplore micro-compounder. The MFR was 25 g/10 min (@230° C./2.16 kg/10 min). The composition consisted of 95 w % polypropylene and 5% of conductive carbonized lignin powder. The extruded strands showed a volume resistivity of 5.2×10^5 Ohm*cm, which was many magnitudes lower than the volume resistivity of pure PP, reported in the literature, about 1×10^17 Ohm*cm (Debowska, M. et. al.: Positron annihilation in carbon black-polymer composites, Radiation Physics and Chemistry 58 (2000), H. 5-6, S. 575-579). This example showed that the conductive carbonized lignin powder from example 13 was in fact electrically conductive.

Example 15

The conductive carbon powder from example 14 was compounded into a Polypropylene matrix (HP 561R from Lyondell Basell) using a DSM Xplore micro-compounder. The composition consisted of 90 w % (PP) and 10% conductive carbonized lignin powder. The extruded strands yielded a volume resistivity of 2.6×10^5 Ohm*cm.
Examples on Reference Conductive Polymer Compounds Example 16

FIG. 1 reflects literature data (Debowska, M. et. al.: Positron annihilation in carbon black-polymer composites, Radiation Physics and Chemistry 58 (2000), H. 5-6, S. 575-579)
regarding volume resistivity of conductive polymer compositions comprising different commercial conductive carbon blacks. The commercial carbon blacks were SAPAC-6 (from CarboChem), Printex XE-2 (from Degussa) and Vulcan XC-72 (Cabot).
FIG. 1 discloses also, additionally, volume resistivity of compositions comprising PP (HP 561R from Lyondell Basell) and 5% and 10%, respectively, of conductive carbon powder described above.
The figure shows that conductive carbonized lignin powder provided by the present invention has at least the same conductivity performance as the best commercial carbon black (Printex XE-2).

Example 17

In order to measure the electrical conductivity of the powder samples, the powder was filled into a hollow cylinder. This cylinder was made of non-conductive PMMA which was cleaned thoroughly between each measurement. The inner diameter was 5 mm. At the bottom of the cylinder there was a gold plated copper plate as a base electrode. The second electrode was a copper stamp which was also gold plated and formed the second electrode. The stamp was then inserted into the cylinder thus slowly compressing the powder. Through a force measurement and online position measurement the applied pressure as well as the volume within the powder filled chamber was plotted. Through applying a DC voltage to the two electrodes the absolute resistance could be measured. Together with the documented position of the stamp a volume resistivity could be calculated. In order to compare various samples with potentially varying specific volumes the resistivity values could only be compared at equal pressure levels. In the presented results the chambers were filled with powder and compressed to the maximal pressure of 31 MPa. The measured value is indicated in FIG. 2.
The results presented in the figure clearly state that the lignin based carbonized powders (CLP) exhibit the same conductivity/resistivity performance as the commercially available grade of Cabot (Cabot Vulcan XC-72-R).
In the figure:
Example 13-1=Example 13 as mentioned above
Example 13-2=Example 13, but not manually crushed with a lab mortar but cryo milled.

Example 18

The products in examples 8-11 set out above earlier was also compared with commercial grade carbon fibres (Toho Tenax HTA40 6 k and Mitsubishi Dialead K13C, respectively—their values were taken from a product sheet and the internet, respectively). The results are given in FIG. 3.
Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted compositions or methods may be combined with other known methods. Other aspects, advantages and modifications within the scope of the invention will be apparent to those skilled in the art to which the invention pertains.

The invention claimed is:
1. A method for manufacturing an electrically conductive carbon powder comprising:
i) providing a lignin and at least one additive,
ii) mixing the lignin and the at least one additive to form a mixture,
iii) shaping the mixture to form a shaped body,
iv) performing a thermal treatment of the shaped body in which a first step of the thermal treatment comprises a temperature ramp from room temperature to a temperature of up to 300° C. or less and in which a last step of the thermal treatment comprises a temperature ramp from room temperature to a temperature of up to about 2000° C. or less in an inert atmosphere to provide a conductive carbonized intermediate product, and
v) pulverizing the conductive carbonized intermediate product to provide a conductive carbon powder.
2. A method according to claim 1 wherein the at least one additive comprises a plasticizer, a reactive agent that renders the lignin melt extrudable, an aliphatic acid, a lignin solvent, an aprotic polar solvent, an aliphatic amide, dimethylformamide (DMF), dimethylacetamide (DMAc), a tertiary amine oxide, N-methylmorpholine-N-oxide (NMMO), dimethylsulfoxide (DMSO), ethylene glycol, di-ethylene glycol, a low-molecular-weight poly ethylene glycol (PEG) having a molecular weight between 150 to 20,000 g/mol, ionic liquids, or combinations thereof.

3. A method according to claim 1 wherein the at least one additive is a poly ethylene glycol.

4. A method according to claim 1 wherein the temperature ramp of the last step is from room temperature up to the temperature of about 1600° C. or less.

5. A method according to claim 1 wherein the temperature ramp of the last step is from room temperature up to the temperature of about 1400° C. or less.

6. A method according to claim 1 wherein the first step takes place in air.

7. A method for manufacturing a conductive carbon powder comprising the following steps:
　a) thermal treatment of a lignin comprising compound to increase the carbon content to at least 80% to obtain an electrically conductive carbonized lignin intermediate product wherein a first step of the thermal treatment comprises a temperature ramp from room temperature to a temperature of up to 300° C. or less; and
　b) mechanical treatment of the electrically conductive carbonized lignin intermediate product to obtain a carbonized lignin powder which is electrically conductive.

8. A method according to claim 7 wherein a last step of the thermal treatment comprises a temperature ramp from room temperature to a temperature of up to about 2000° C. or less in an inert atmosphere.

9. A method according to claim 7 wherein a last step of the thermal treatment comprises a temperature ramp from room temperature to a temperature of up to about 1600° C. or less.

10. A method according to claim 7 wherein a last step of the thermal treatment comprises a temperature ramp from room temperature to a temperature of up to about 1400° C. or less.

11. A method according to claim 7 wherein the lignin comprising compound comprises lignin and at least one additive.

12. A method according to claim 7 wherein the at least one additive comprises a plasticizer, a reactive agent that renders the lignin melt extrudable, an aliphatic acid, a lignin solvent, an aprotic polar solvent, an aliphatic amide, dimethylformamide (DMF), dimethylacetamide (DMAc), a tertiary amine oxide, N-methylmorpholine-N-oxide (NMMO), dimethylsulfoxide (DMSO), ethylene glycol, di-ethylene glycol, a low-molecular-weight poly ethylene glycol (PEG) having a molecular weight between 150 to 20,000 g/mol, ionic liquids, or combinations thereof.

13. A method according to claim 7 wherein the at least one additive is a poly ethylene glycol.

14. A method according to claim 7 wherein the mechanical treatment comprises pulverizing the electrically conductive carbonized lignin intermediate product.

15. A method according to claim 7 wherein the first step takes place in air.

16. A method for manufacturing a carbonized intermediate product in filament form, comprising:
　providing a lignin and at least one additive,
　mixing the lignin and the at least one additive to form a mixture,
　melt spinning the mixture to a monofilament or multifilament bundle component,
　performing a thermal treatment of monofilament or multifilament bundle in which a first step of the thermal treatment comprises a temperature ramp from room temperature to a temperature of up to 300° C. or less and a last step comprises a temperature ramp from room temperature to a temperature of up to about 2000° C. or less in an inert atmosphere to provide a conductive carbonized intermediate product in filament form.

17. A method according to claim 16 wherein the at least one additive comprises a plasticizer, a reactive agent that renders the lignin melt extrudable, an aliphatic acid, a lignin solvent, a aprotic polar solvent, an aliphatic amide, dimethylformamide (DMF), dimethylacetamide (DMAc), a tertiary amine oxide, N-methylmorpholine-N-oxide (NMMO), dimethylsulfoxide (DMSO), ethylene glycol, di-ethylene glycol, a low-molecular-weight poly ethylene glycol (PEG) having a molecular weight between 150 to 20,000 g/mol, ionic liquids, or combinations thereof.

18. A method according to claim 16 wherein the at least one additive is a poly ethylene glycol.

19. A method according to claim 16 wherein the temperature ramp of the last step is from room temperature up to the temperature of about 1600° C. or less.

20. A method according to claim 16 wherein the first step takes place in air.

* * * * *